(12) United States Patent
Jin et al.

(10) Patent No.: US 6,330,689 B1
(45) Date of Patent: Dec. 11, 2001

(54) SERVER ARCHITECTURE WITH DETECTION AND RECOVERY OF FAILED OUT-OF-PROCESS APPLICATION

(75) Inventors: Lei Jin, Newcastle; David L. Kaplan, Mercer Island; Murali R. Krishnan, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/066,504

(22) Filed: Apr. 23, 1998

(51) Int. Cl.[7] .................................................. G06F 11/00
(52) U.S. Cl. ................................................ 714/15; 714/47
(58) Field of Search .................................. 714/2, 4, 6, 8, 714/10, 11, 13, 15, 47

(56) References Cited

U.S. PATENT DOCUMENTS

| | | | |
|---|---|---|---|
| 5,113,496 | * 5/1992 | McCalley et al. | 395/200 |
| 5,566,297 | * 10/1996 | Devarakonda et al. | 714/15 |
| 5,659,682 | * 8/1997 | Devarakonda et al. | 714/47 |
| 5,978,565 | * 11/1999 | Ohran et al. | 714/13 |
| 5,987,621 | * 11/1999 | Duso et al. | 714/4 |

* cited by examiner

Primary Examiner—James P. Trammell
Assistant Examiner—Pierre Eddy Elisca
(74) Attorney, Agent, or Firm—Lee & Hayes, PLLC

(57) ABSTRACT

A server architecture has a server program to receive client requests and multiple applications to process the requests. Each application comprises a collection of agents that can be invoked to process the requests and an application manager that manages the collection of agents. The agents within the associated collection are independent from, but dynamically accessible by, the application manager. Depending on the request, the application manager selects one or more agents to generate content to be returned to the client. An application manager director manages the application managers and facilitates delivery of the client requests from the server program to the suitable application. The application managers are independent from, but dynamically accessible by, the application manager director. For a given request, the director selects the appropriate application manager to handle the request. The application manager, in turn, selects the appropriate agent to process the request. The applications, including the agents and associated application managers, can be run either in-process or out-of-process with the server program. The server architecture has a detection and recovery subsystem that detects when an out-of-process application crashes and then recovers the application from that crash. The subsystem logs requests when they are passed to the out-of-process application, and remove the requests from the log when responses to the requests are returned from the application. If the out-of-process application crashes while one or more requests are outstanding, those requests remain listed on the log and thus readily identifiable. During recovery, the subsystem cleans up the outstanding requests until the log is cleared. Thereafter, the subsystem restarts the failed application to restore the service.

31 Claims, 12 Drawing Sheets

1

SERVER ARCHITECTURE WITH DETECTION AND RECOVERY OF FAILED OUT-OF-PROCESS APPLICATION

TECHNICAL FIELD

This invention relates to servers for computer network systems. More particularly, this invention relates to a server architecture that implements a dynamic content method for generating client responses.

BACKGROUND

A computer network system has one or more host network servers connected to serve data to one or more client computers over a network. FIG. 1 shows a simple computer network system 20 with a single host network server 22 connected to serve data to a client 24 via a network 26. The client 24 sends a i request for data and/or services to the server 22 over the network 26. The server 22 processes the request and returns a response over the network 26. If the request is for data, the server 22 accesses a database 28 to retrieve the requested data 30 and returns the data 30 as part of the response.

The client-server system 20 is representative of many different environments. One particular environment of interest is the Internet. The server 22 runs a Web server software program that accepts requests from client-based programs (e.g., browsers) and returns data 30 in the form of Web pages or documents to the client 24. The Web pages are commonly written in HTML (hypertext markup language) and XML (extensible markup language). Web pages are transmitted using conventional network protocols, such as TCP/IP (Transmission Control Protocol/Internet Protocol), HTTP (Hypertext Transfer Protocol) and DCOM (Distributed Component Object Model). The client 24 executes a browser or other application to render the Web page into human-perceptible forms. A Web document might include text, images, sound, video, active code, and so forth.

Documents served from a server to client are typically generated using either or both of two methods: a static content method and a dynamic content method. In a static content method, the document is created in advance and stored statically on a server database. When a client requests the document, the server retrieves the document and transmits it over the network to the client. FIG. 1 is an example in which the server retrieves the static data 30 from database 28 and serves the data to the client 24. It is further noted that conventional servers, and particularly Web servers, may be configured to push the content to the client without receiving a request. The static content method has an advantage of minimizing the user's perceived response time, meaning the time between requesting the document and seeing it rendered on a computer screen. It has a disadvantage that all users who request the document receive exactly the same content. With static content, the server cannot respond to specific user requests or personalize a document for individual users.

In a dynamic content method, the document is generated dynamically by the server. When a client requests a document, the server invokes one or more agents, feeding the agents relevant parameters from the user's request (such as the user's name). The agent(s) generate the document that satisfies the user's request and the server returns the document over the network to the client. The dynamic content method has the advantage of responding to specific user requests or personalizing content for individual users. It has the disadvantage that the user's perceived response time will generally be longer than with static document requests. This is because the document generation process involves additional time to invoke the appropriate agent(s) and generate the document.

The server generates dynamic content documents by invoking an agent in one of two ways: an "out-of-process" method and an "in-process" method. In an "out-of-process" method, the agent runs in its own process and address space, separate from the server's process and address space. Typically, the out-of-process method uses the industry-standard common gateway interface (CGI) as the communication mechanism between the server and agent. CGI is described in a publicly available document on the Web at hftp://hoohoo.ncsa.uiuc.edu/cgi. In an "in-process" method, the agent runs within the Web server's process and address space. The in-process method typically uses a vendor-specific application programming interface, like the Internet Server Application Programming Interface (ISAPI) implemented by Internet Information Server (IIS), which is available from Microsoft Corporation. The ISAPI technology is described in more detail in a document at http://www.microsoft.com/iis/Support/iishelp/iis/misc/documentation.asp.

To illustrate the two dynamic content methods and how they can be used in conjunction with the static content method, consider a scenario in which the server 22 runs a Web server for an online retail company. When the client 24 first accesses the Web site, the server 22 might retrieve a pre-existing home page for the company from the database 28 and serve that page to the client 24. This initial step is an example of a static content method. From the home page, the client might request to view an online catalog of products offered by the company. In response, the Web server might invoke a catalog agent to guide the user through various product offerings. When the user decides to purchase a product, the client submits an order request. In response, the Web server might invoke an order agent to assist the user in ordering the product. The steps involved with actively serving a catalog or taking an order are examples of dynamic content methods. They both involve dynamic generation of documents in response to input received from the client.

FIG. 2 shows an "out-of-process" method under this scenario. The server 22 runs a Web server 40 as process 1. The Web server 40 handles the incoming requests from the client. When the client first hits the Web site, the Web server 40 retrieves the company's home page 42 from the database 28 and transmits the home page 42 to the client. When the client sends an order request, the Web server 40 initiates an order manager 44 to assist the user with ordering the desired product or service. The order manager 44 is initiated using the CGI technology as a second process 2, which uses a separate process and address space than process 1, as represented by the dashed lines.

When the user selects an item, the order manager 44 dynamically generates an order document 46 that contains the user's name, a description of the selected item, the cost of the item, and payment terms. The order manager 44 returns the order document 46 to the Web server 40, which then serves the document 46 to the client. Afterwards, the order manager 44 is terminated and the second process 2 is halted.

The out-of-process method shown in FIG. 2 has an advantage in crash prevention and recovery. If the out-of-process order manager 44 is unreliable and ultimately crashes, it will not cause the Web server 40 to crash. However, the out-of-process method has a disadvantage in that a particular agent must be loaded into memory each time a request arrives for it. Using CGI technology, the agent must also be unloaded from memory once it finishes the request. This loading and unloading consumes resources, resulting in a relatively slow response time. Another problem compounding the slowness is that the out-of-process method involves cross-process communication between processes 1 and 2, including such activities as marshalling, messaging, and the like.

A variation of CGI, known as FastCGI, allows the server to keep the agent loaded, rather than terminating the agent each time it responds to a particular request. FastCGI is an improvement over CGI in that it saves the per-request invocation overhead, thereby improving the response time. However, the FastCGI is still run in a separate process, and hence the drawbacks associated with cross-process communication remain. A more detailed discussion of FastCGI is found at htt://www.fastcgi.com/kit/doc/fastcgi-whitepaper/fastcgi.htm.

FIG. 3 shows an "in-process" method under the same scenario of the online retail company. In this case, when the client sends an order request, the Web server 40 initiates an order manager 48 to assist the user with ordering the desired product or service. The order manager 48 is initiated using the ISAPI technology to run within the same process 1 as the Web server 40. That is, the Web server 40 and the order manager 48 use the same process and address space designated by the server. When the user selects an item from the online catalog, the order manager 48 dynamically generates an order document 50 that contains the user's name, a description of the selected item, the cost of the item, and payment terms. The order manager 48 returns the order document 50 to the Web server 40, which then serves the document 46 to the client. The order manager 48 can remain loaded for other requests, or terminated when desired.

The in-process method is advantageous in that a particular agent need only be loaded into memory once, when the first request arrives for it. The agent can then remain in memory within the server's process and address space, and can handle additional requests that arrive for it. The in-process method has a further advantage in that there is no need for cross-process communication. As a result, the in-process method is comparatively faster than the out-of-process method. However, the in-process method has the disadvantage that if the agent is unstable and crashes, it will cause the server to crash too.

Most large Web sites and many smaller ones deliver one or more applications in the traditional information system sense. A site that supports catalog shopping, library browsing or database access will typically consist of many separate agents and documents that together implement the site's "application"; in other words, the unified experience presented by the Web site to the user. The developer of such a site needs a mechanism to organize an application's software components to enforce consistency, compatibility, version control, and other requirements across components. It is also desirable to construct high performing agents because they often provide the most appealing content delivered by the Web site. The agents are often required to process more than their proportionate share of user requests. Agents that perform slowly may cause users to abandon a Web site because they become frustrated with slow response times, no matter how appealing the content might be.

A Web site developer is also interested in protecting the site against system or process crashes. A Web server can host many Web applications. The applications may be hastily developed and, while effective at certain tasks, may perform unpredictably when subjected to high volume or wide variety of user requests at an active Web site. If not guarded against, such unpredictable applications may bring down the entire site. Accordingly, a developer would like to be able to isolate "trusted" components (i.e. components that are fully tested, debugged, and judged to be crash proof in normal operation) from non-trusted components.

Another advantage of isolated application is that you can stop and unload application components from memory without interfering with the operation of the Web site. Stopping an isolated application is extremely convenient way to install new components because you don't have to stop and restart the web server to stop and restart an application.

Accordingly, there is a need in the industry to further improve the dynamic content methods for serving documents and other data to clients. There is a need to develop an architecture which enables Web site developers to create high performing agents, to organize the agents in functional groups for optimal performance at a given Web site, and to design isolation between the trusted agents and the non-trusted agents.

SUMMARY OF THE INVENTION

This invention concerns a server architecture that enables isolation of non-trusted agents, which are run out-of-process, and the ability to detect and recover failed out-of-process agents. The server architecture provides a managerial hierarchy to manage the agents and to control how the client requests are handled. An application manager manages each collection of agents. The agents within the associated collection are independent from, but dynamically accessible by, the application manager. Depending on the request, the application manager selects one or more agents to generate content to be returned to the client. In this manner, the application manager and associated agents under its control form an application for processing client requests. In a Web environment, for example, an application designed for an online retail company might be configured as a catalog application, or an ordering application, or a customer service application, and so forth.

An application manager director manages the application managers. The application managers are independent from, but dynamically accessible by, the application manager director. Depending on the request, the director selects the appropriate application manager to handle the request, which in turn selects the appropriate agent to process the request. According to the managerial hierarchy, the director first decides which server application is best suited to handle the incoming request, and then the application manager within the chosen server application decides which specific agent should process the request.

The director can be implemented as part of the general server software. The separate server applications (i.e., the agents and associated application managers) can be run either in-process or out-of-process with the server software. An in-process application offers higher performance at the risk of crashing the system if one agent performs unreliably. An out-of-process application affords high reliability and crash protection at the expense of lower performance due to cross-process communication.

The server architecture has a detection and recovery subsystem that detects when an out-of-process application crashes and then recovers the application from that crash. The subsystem logs requests when they are passed to the out-of-process application, and removes the requests from the log when responses to the requests are returned from the application. If the out-of-process application crashes while one or more requests are outstanding, those requests remain listed on the log and thus readily identifiable. During recovery, the subsystem cleans up the outstanding requests until the log is cleared. Thereafter, the subsystem restarts the failed application to restore the service.

BRIEF DESCRIPTION OF THE DRAWINGS

The same reference numbers are used throughout the figures to reference like components and features.

DETAILED DESCRIPTION

This invention generally pertains to a server system having a server program to receive client requests and multiple applications to process the requests. The applications can be run in-process or out-of-process with the server program. In-process applications are trusted and expected to run reliably. If an in-process application fails, the entire server program is also likely to fail since the two programs run in the same process space. On the other hand, out-of-process applications are isolated from the server program and hence, their failure should not affect the operation of the server program. However, to maintain a fully operable server site, the server system should detect and restart any out-of-process application that fails. This invention concerns techniques for detecting and recovering failed out-of-process applications.

General Architecture

Figure 1:
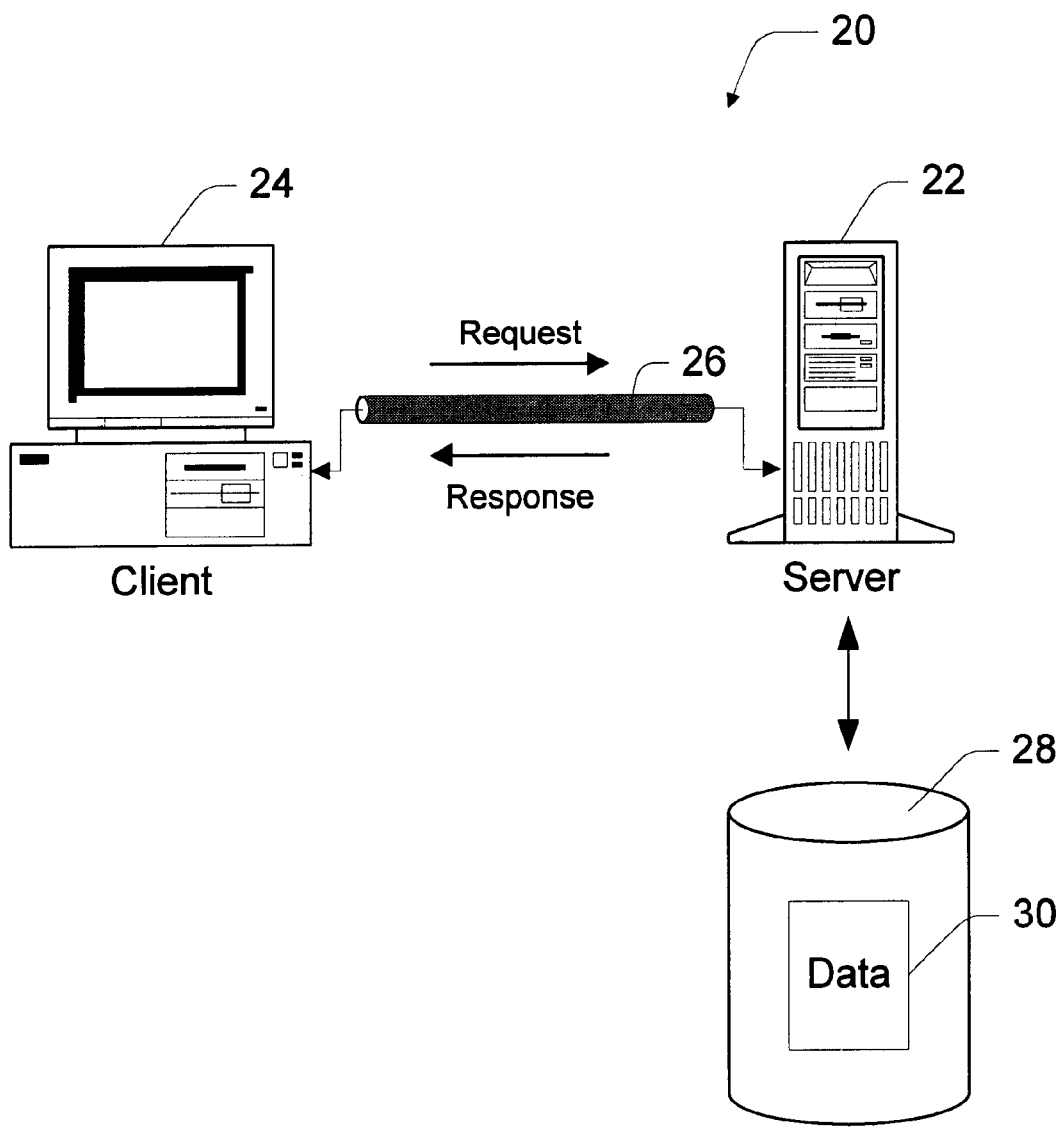
FIG. 1 is a prior art diagrammatic illustration of a client-server system.
Figure 2:
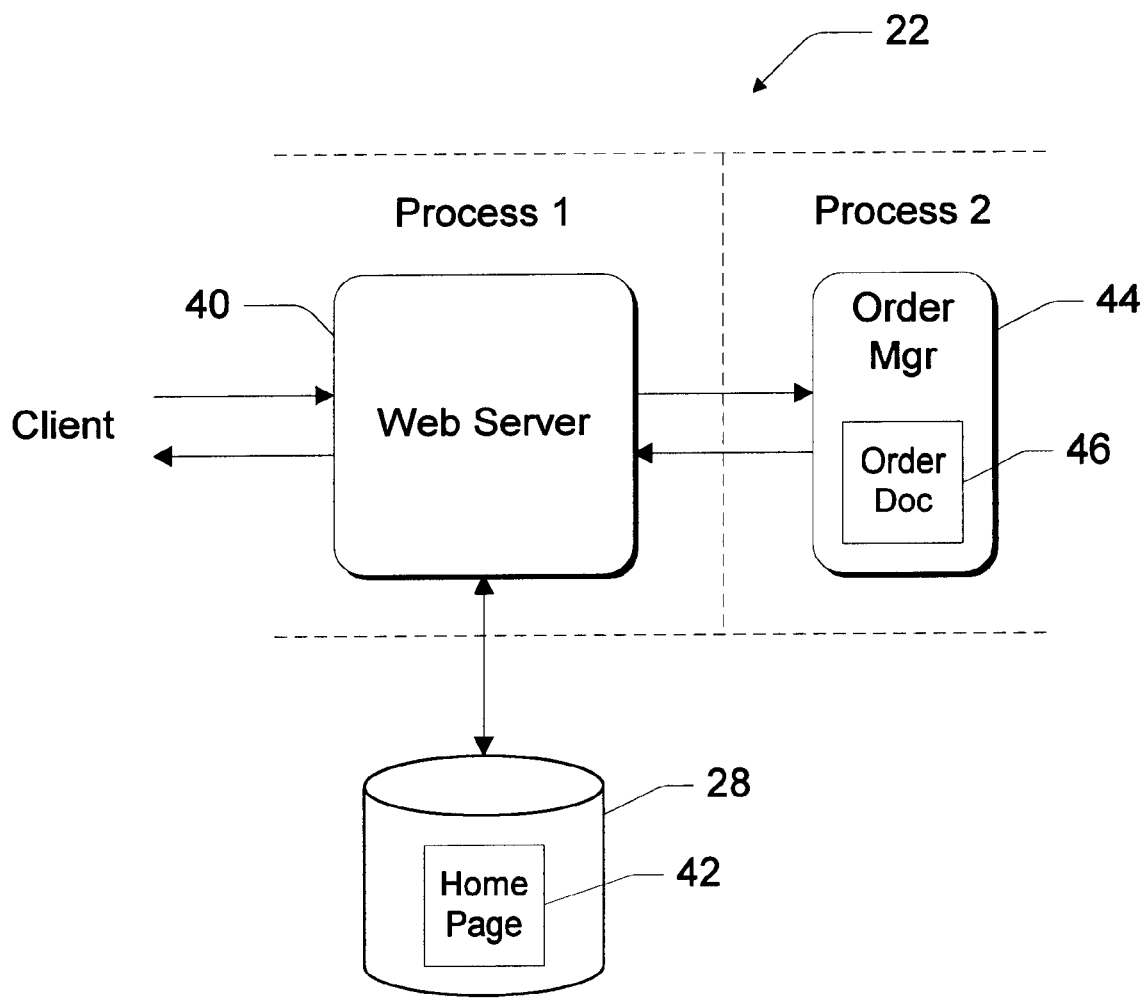
FIG. 2 is a prior art that shows a Web server software program executing on a server computer, and an out-of-process agent invoked by the Web server to dynamically generate a document in response to a client request, according to conventional techniques.
Figure 3:
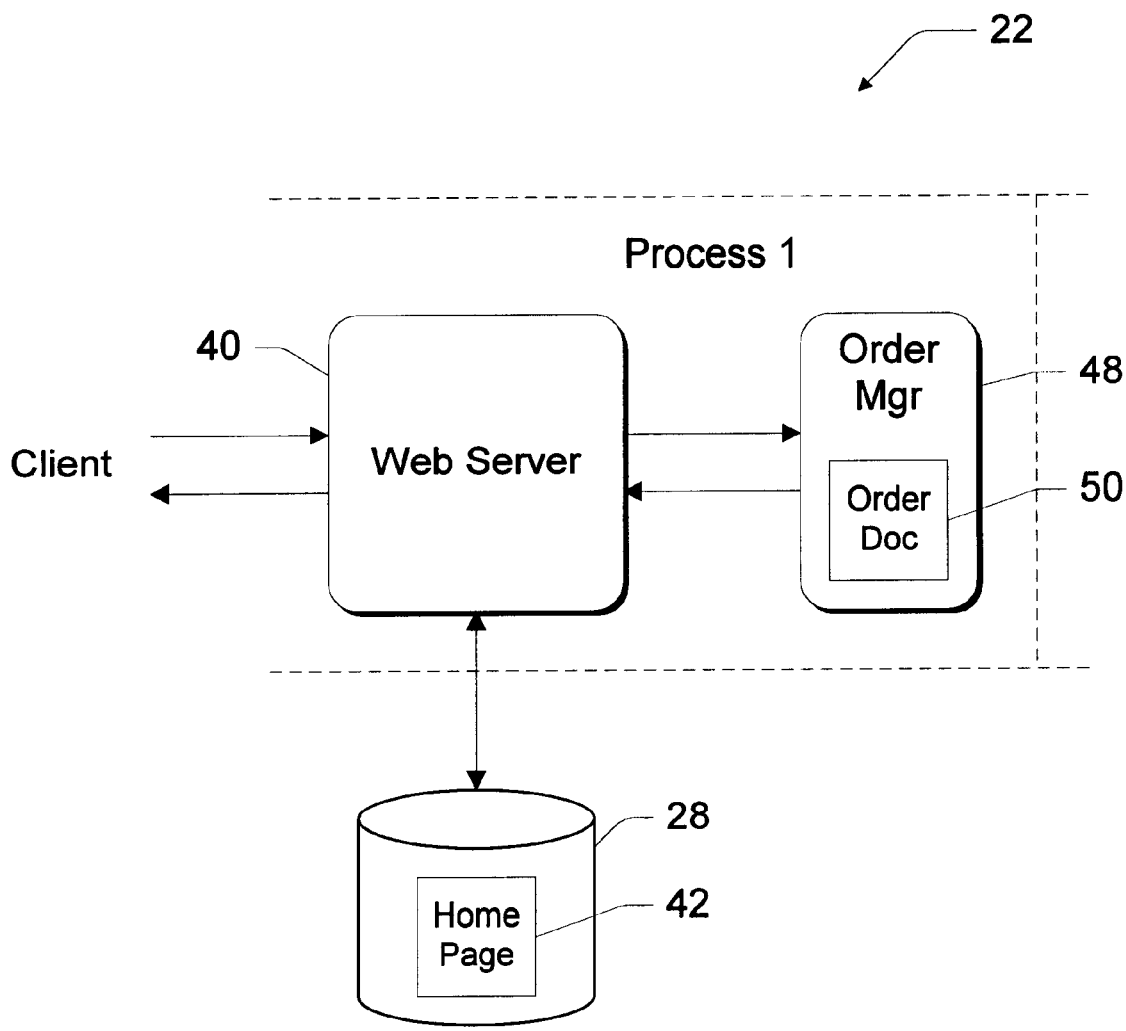
FIG. 3 is a prior art that shows a Web server software program executing on a server computer, and an in-process agent invoked by the Web server to dynamically generate a document in response to a client request, according to conventional techniques.
Figure 4:
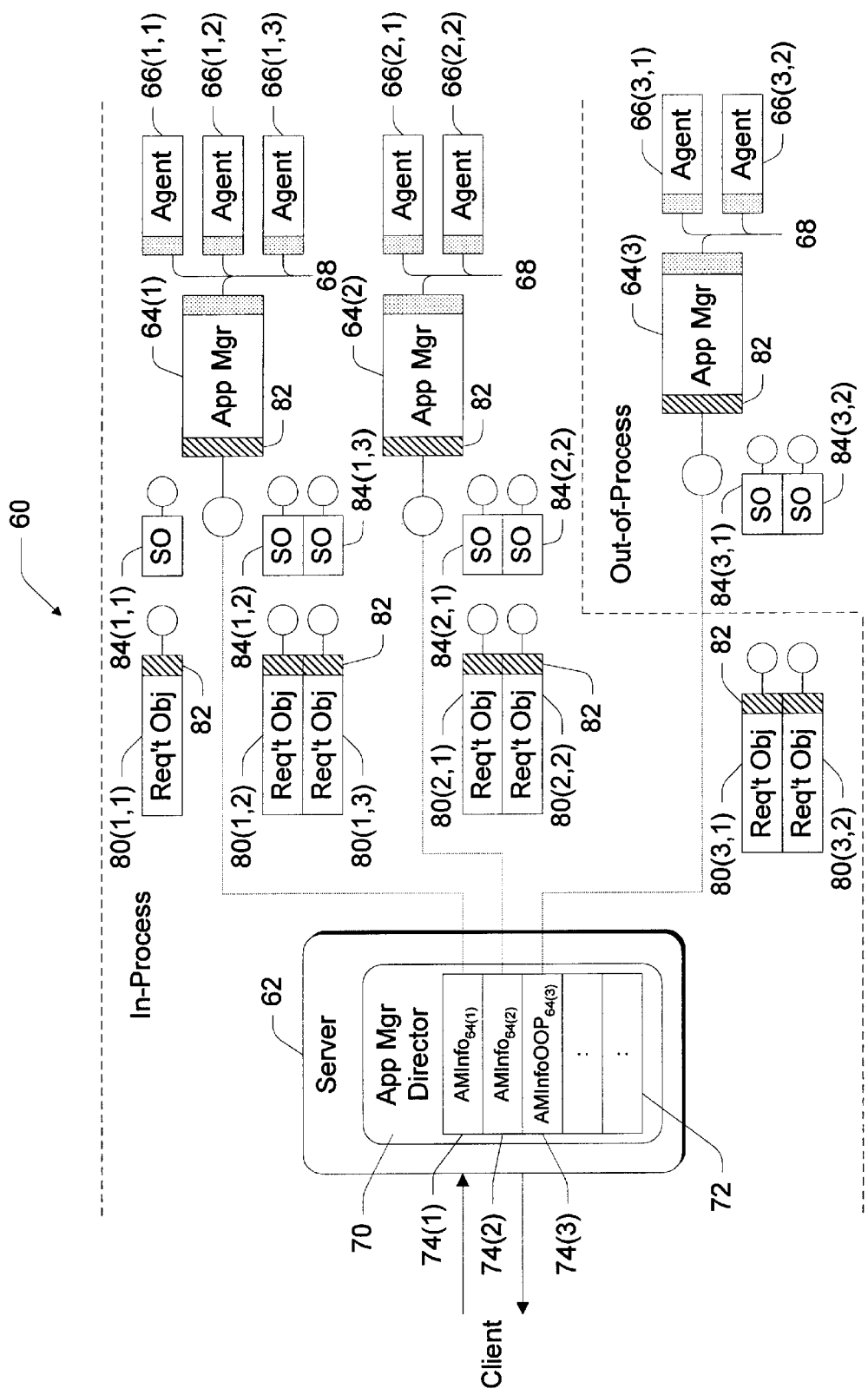
FIG. 4 shows a server software architecture according to an aspect of this invention.

FIG. 4 shows a server software architecture 60, which executes on a server computer, to facilitate client-server sessions between the server computer and a remote client computer (not shown). The architecture 60 is particularly well suited for accommodating dynamic content sessions in which the server dynamically generates and serves a response that is tailored to client. The architecture 60 may be implemented in a number of server environments. For purposes of discussion, the architecture 60 is often described in the exemplary context of an Internet setting, wherein the server program is configured as a Web server at a Web site on the Internet. However, aspects of this invention are not restricted to the Internet environment, but may include other contexts including client-server LANs (local area networks), interactive television, and so forth.

The server architecture 60 includes a server software program 62 that executes on a computer to receive requests from clients and return responses to those clients. An example of a server software program 62 is the Internet Information Server (IIS), which runs on a server operating system such as Windows NT. IIS and Windows NT are well known software products from Microsoft Corporation.

The architecture 60 also includes one or more application managers (AMs), as represented by application managers 64(1), 64(2), and 64(3). Each application manager 64 instantiates an "application" developed to run in conjunction with the server 62. Each application manager 64 manages one or more agents 66 that implement the functionality underlying the application manager 64. Conceptually, the application manager 64 is a dynamic processor of client requests that uses one or more agents to generate content to be returned to the client. The application manager 64 dynamically loads associated agents 66 as needed to handle particular user requests. The application manager 64 can handle an arbitrary number of user requests at a time, and it can load and maintain an arbitrary number of agents 66 into its address space in order to process user requests.

Consider a Web related example, in which the server 62 is configured as a Web server. One application manager 64(1) might be a catalog shopping application containing a first agent 66(1,1) that queries an inventory database to compose catalog pages, a second agent 66(1,2) that presents the user with an order form, and so forth. A second application manager 64(2) might be customer service application containing a first agent 66(2,1) that composes a series of help pages, a second agent 66(2,2) that handles requests to return merchandise, and so on. A third application manager 64(3) might offer another service supported by the Web server 62.

The application managers 64 may run within the server's process (i.e., in-process), or within its own separate process (i.e., out-of-process) either on the same machine as the server or on a different machine. In FIG. 4, application managers 64(1) and 64(2) are in-process with the server program 62, whereas application manager 64(3) is out-of-process with the server program 62. In-process applications allow maximum efficiency at the risk of bringing down the server in the event that the application is not stable. Alternatively, out-of-process applications are effectively isolated so that if an application fails, it should not affect the running of the server. However, this isolation benefit comes at the cost of lower performance when compared to an in-process application. The server architecture 60 advantageously offers the developers the flexibility to run either or both in-process and out-of-process applications.

Each application manager 64 can be implemented in software as an object. Each object is configured using ISAPI technology, and hence can remain loaded, regardless of whether they are in-process or out-of-process with the server 62. Each AM object 64 communicates with an associated agent 66 via an ISAPI interface 68.

The server architecture 60 has an application manager director 70 to manage the application managers 64(1)–64(3). The AM director 70 determines which application manager 64(1)–64(3) should service a given client request. The AM director 70 also starts and stops as required by user requests. Another task of the AM director 70 is to detect when the out-of-process application manager 64(3) has crashed and optionally, to attempt to re-start the failed manager.

The AM director 70 maintains a lookup table 72 listing all active application managers. Entries in this table 72 reference an object for each corresponding active application manager 64(1)–64(3). Table 72 contains an object AMInfo 74(1) and 74(2) for each of the in-process application managers 64(1) and 64(2), and an object AMInfoOOP for the out-of-process application manager 64(3). These objects 74 contain data and parameters to communicate with the associated application managers.

When a client request arrives, the application manager director 70 determines which application manager 64 ought to handle the request. Once an application manger is selected, the AMInfo object associated with the selected application manager creates a new request object 80 containing the data in the client request that will be processed by an agent 66. More particularly, the request object 80 holds request-specific information, such as user name, network connection, callback information, and so forth. The AMInfo object then passes the request object 80 to the AM object 64 for execution.

Numerous request objects can exist simultaneously, as represented by request objects 80(1,1), 80(1,2), and 80(1,3) directed to application manager 64(1), request objects 80(2,1) and 80(2,2) directed to application manager 64(2), and request objects 80(3,1) and 80(3,2) directed to application manager 64(3). In one implementation, the AM object 64 invokes a single agent 66 for each corresponding request object 80. However, this condition need not be met in other implementations.

The request objects 80 communicate with the AM objects 64 via a marshalable interface 82. This means that, optionally, the parameters of a method call to the interface 82 of either the AM object 64 or the request object 80 can be copied and passed by value, instead of being passed by reference. Hence, the interface 82 can optionally be used in-process or out-of-process. Marshalling lets the AM director 70 decide at runtime whether to route a request to an in-process or an out-of-process AM object.

Various types of technologies support the marshalable interface 82. As one example, the AM and request objects can be based on COM (component object model) and RPC (remote procedure call) technologies. These technologies provide generic mechanisms for allowing objects to communicate with each other solely through interfaces, with no knowledge of the other object's internal data structure, and optionally across process boundaries.

At the object level, there is little difference whether the AM objects 64 are in-process or out-of-process. The same data is communicated between the request objects 80 and the AM objects 64, regardless of whether there is a process boundary between them. The difference between in-process and out-of-process methods is manifest at the marshalable level. To communicate across a process boundary, as is the case between request objects 80(3,1), 80(3,2) and the AM object 64(3), the marshalable interface 82 might employ either a stub and proxy protocol or RPC. COM, stub and proxy, and RPC are all well known. In addition, the objects might employ other technologies that permit process isolation, such as the DCOM (distributed component object model) technology. When a request object 80 is handed off to an application manager 64, the application manager 64 creates a corresponding shadow object (SO) 84. The shadow object 84 contains a subset of the data in the corresponding request object 80, along with information on how to report back to the request object. For each active shadow object 84, the application manager 64 invokes a suitable agent 66 to process the request data in the shadow object. If more data from the request is needed, the shadow object 84 returns to the request object 80 to obtain the additional data. From the agent's perspective, it is unaware wheth the data is from the shadow object 84, or whether the shadow object had to callback to the request object 80 and obtain the data. The agent 66 passes the results back to the application manager 64, which in turn passes the results to the request object 80.

The application manager director 70, the application managers 64, and the agents 66 form a dynamic content generation system that handles client requests which involve dynamic generation of content. That is, the server 62 will determine what type of response is needed for the request. If a static content response is in order (e.g., serving a home page), the server 62 can bypass this system and simply serve a pre-existing static response to the client. Conversely, if the client request requires something more than pre-existing static data, the server uses the dynamic content generation system to create the appropriate response using the information in the client request.

Tables 1–3 list primary data structure elements for the various objects in the server architecture 60. A data structure for the AM object 64 is shown in table 1.

TABLE 1

| Application Manager Object |
| --- |
| Reference count |
| Flag indicating whether application manager is in-process or out-of-process |
| Table of running agents |
| List of shadow objects for requests currently being processed |

A data structure for a request object 80 is shown in table 2.

TABLE 2

| Request Object |
| --- |
| Reference count |
| Pointer to server's native request object |
| Pointer to application manager which will process the request. |
| Cover functions for server methods. |
| Pointer to shadow object for pending asynchronous input/output operation, if any. |

A data structure for a shadow object 84 is shown in table 3.

TABLE 3

| Shadow Object |
| --- |
| Reference count |
| Pointer to request object |
| State information for pending asynchronous input/output operation, if any. |

OUT-OF-PROCESS CRASH DETECTION AND RECOVERY SUBSYSTEM

The server architecture 60 implements a crash detection and recovery subsystem that detects failed out-of-process applications and recovers them to return the server site to full operation. The subsystem does not address in-process applications because their failure would cause the entire site to crash. Thus, the crash detection and recovery subsystem is particularly directed to out-of-process applications, such as the application consisting of application manager 64(3) and agents 66(3,1) and 66(3,2).

In general, the crash detection and recovery subsystem tracks the requests that are destined for the out-of-process application. The requests are logged when they go out to the application, and removed from the log when responses are returned from the application. If an application crashes while one or more requests are outstanding, those requests remain listed on the log and thus readily identifiable. During recovery, the subsystem cleans up the outstanding requests until the log is cleared. Thereafter, the subsystem restarts the failed application to restore the service.

Figure 5:
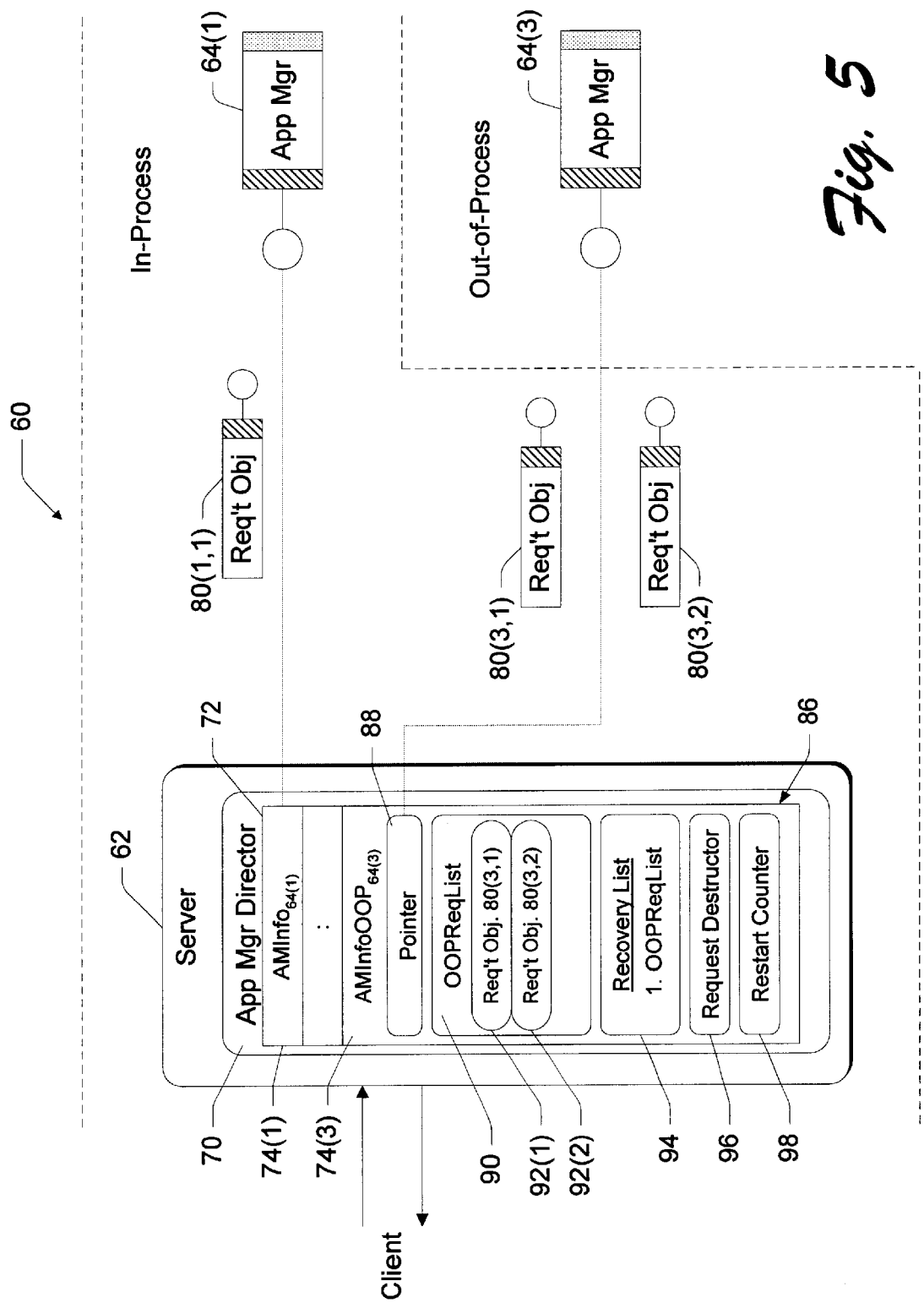
FIG. 5 shows a crash detection and recovery subsystem implemented in the server software architecture

FIG. 5 shows the crash detection and recovery subsystem 86 implemented in the server architecture 60 of FIG. 4. In the FIG. 5 implementation, the crash detection and recovery system 86 is implemented within the AMInfoOOP object 74(3) that corresponds to the out-of-process application manager 64(3). The AMInfoOOP object 74(3) maintains a pointer 88 to the current instance of the application manager 64(3).

One task of the AMInfoOOP object 74(3) is to play a gatekeeper role for the crash detection and recovery subsystem. Before a request object 80 is sent to the out-of-process application manager 64(3), the AMInfoOOP object 74(3) is consulted to determine whether the application manager is still running. If so, the AMInfoOOP object 74(3) records the request object 80 on a list 90 before sending the request object across the process boundary (illustrated as a dashed line). If the application manager 64(3) is determined to be crashed, the AMInfoOOP object 74(3) effectively closes the gate and blocks the output of the request object.

In the illustrated implementation, the list 90 is implemented as an object named "OOPReqList". The OOPReqList object 90 tracks outgoing requests and hence, provides a recollection list of outstanding requests in the event that the out-of-process application 64(3) crashes before the requests are answered. In FIG. 5, the OOPReqList has two entries 92(1) and 92(2), which reflect that corresponding request objects 80(3,1) and 80(3,2) have been sent to the out-of-process application manager 64(3).

The crash detection and recovery subsystem 86 also includes a recovery list 94 maintained within the AMInfoOOP object 74(3). The recovery list 94 references the currently active OOPReqList objects, such as OOPReqList object 90. An OOPReqList object 90 is added to the recovery list 94 when the corresponding application manager 64(3) is first started to handle client requests. If the application manager crashes and is subsequently restarted, a new OOPReqList object is created for the new instance of the application manager and a reference to the new OOPReqList object is added to the recovery list 94. Accordingly, the same application manager, if crashed and restarted multiple times, can have multiple corresponding OOPReqList objects holding one or more requests that are destined to the application manager at various times. An OOPRequestList object 90 is removed from the recovery list when it is emptied and all the requests on the lists are expired and removed.

The subsystem 86 detects when an out-of-process application manager 64(3) has crashed by examining responses it returns. More particularly, when a request returns from the COM/RPC stack, the AMInfoOOP object 74(3) checks the return status of the request before the request leaves the gate. The return status indicates whether the remote application manager is operating normally or abnormally. If abnormal operation is detected, the out-of-process application is deemed to be crashed. If normal operation is detected, the request object is permitted to exit the gate and be passed back by the server to the client.

When an out-of-process application crashes, meaning that the out-of-process application manager 64(3) or an agent 66(3,1) or 66(3,2) under its control has failed to perform properly, the AMInfoOOP object 74(3) prevents further requests from being output to the failed application. The AMInfoOOP object 74(3) consults the recovery list 94 for all pending OOPReqList objects 90 corresponding to the failed application manager 64(3).

The pending OOPReqList object 90 identifies zero or more request objects that are currently being referenced by an external source such as a COM/RPC layer or an out-of-process application manager. In FIG. 5, the OOPReqList object 90 lists two entries 92(1) and 92(3) for the outstanding request objects 80(3,1) and 80(3,2). Each request object 80 has a non-zero reference count(see Table 2), thereby reflecting that it is being referenced by an external source. It is the outstanding request objects listed in the pending OOPReqList objects 90 that the subsystem 86 is left to clean up following an out-of-process crash. Recovery, then, does not necessarily assure that all pending requests to an out-of-process application are ultimately answered, for example by resubmitting them to a restarted application, but only that the requests are not left pending indefinitely. In one implementation, the requests left in the OOPReqList objects are not resubmitted after the application restarts; rather, only requests that were blocked are passed through to the new application manager.

Following an out-of-process crash, the reference to the request object 80 might never be released, resulting in a potential resource-leaking problem. A simple solution is to remove all request objects from the OOPReqList object 90 after the crash. However, it is not known whether the requests had already finished their out-of-process trip and were on their way back from the COM/RPC stack. Thus, the simple solution might induce a server crash due to a race condition in deleting the request object in a multi-thread process. Indeed, a working thread, or a crash repair thread, might free a request object that has successfully returned from the COM/RPC stack.

It is the responsibility of the AMinfoOOP object 74(3) to properly cleanup any leftover requests listed in the OOPReqList object 90. Every OOPReqList records the time the corresponding out-of-process application manager crashes. The AMNnfoOOP object 74(3) begins cleaning up the OOPReqList after a preset time period expires. The time-out period solves any race conditions that might arise from releasing a reference to a request object among a working thread, a scheduler thread, or the thread doing the cleanup.

The crash detection and recovery subsystem 86 has a request destructor 96 to destroy any remaining request objects 92 listed in the OOPReqList object 90 following the time-out period. The request destructor 96 causes the request object 92 to remove itself from the list.

The crash detection and recovery subsystem 86 can restart a failed out-of-process application before cleanup is complete. When the application is restarted, the AMInfoOOP object 74(3) creates a new OOPReqList object to track future requests to the newly started application. Meanwhile, the subsystem 86 can continue to cleanup existing OOPReqList objects that still hold requests to the failed instance of the out-of-process application manager. At the end of recovery, the AMInfoOOP object 74(3) resumes new requests via calls to the new instance of the application manager. Therefore, a continuous and uninterrupted service to the trouble application is guaranteed.

The crash detection and recovery subsystem 86 can restart the failed out-of-process application manager multiple times. The subsystem 86 may implement a counter 98 to count the number of times that the application is restarted. An administrator can set a maximum recover limit to cap the number of times that an out-of-process application manager will be restarted. Once the number of restarts in counter 98 reaches the recover limit, the subsystem 86 quits attempting to restart the out-of-process application manager. In this manner, the server resources will not be unnecessarily wasted trying to restart a truly unreliable application.

Exemplary Server Implementation

Figure 6:
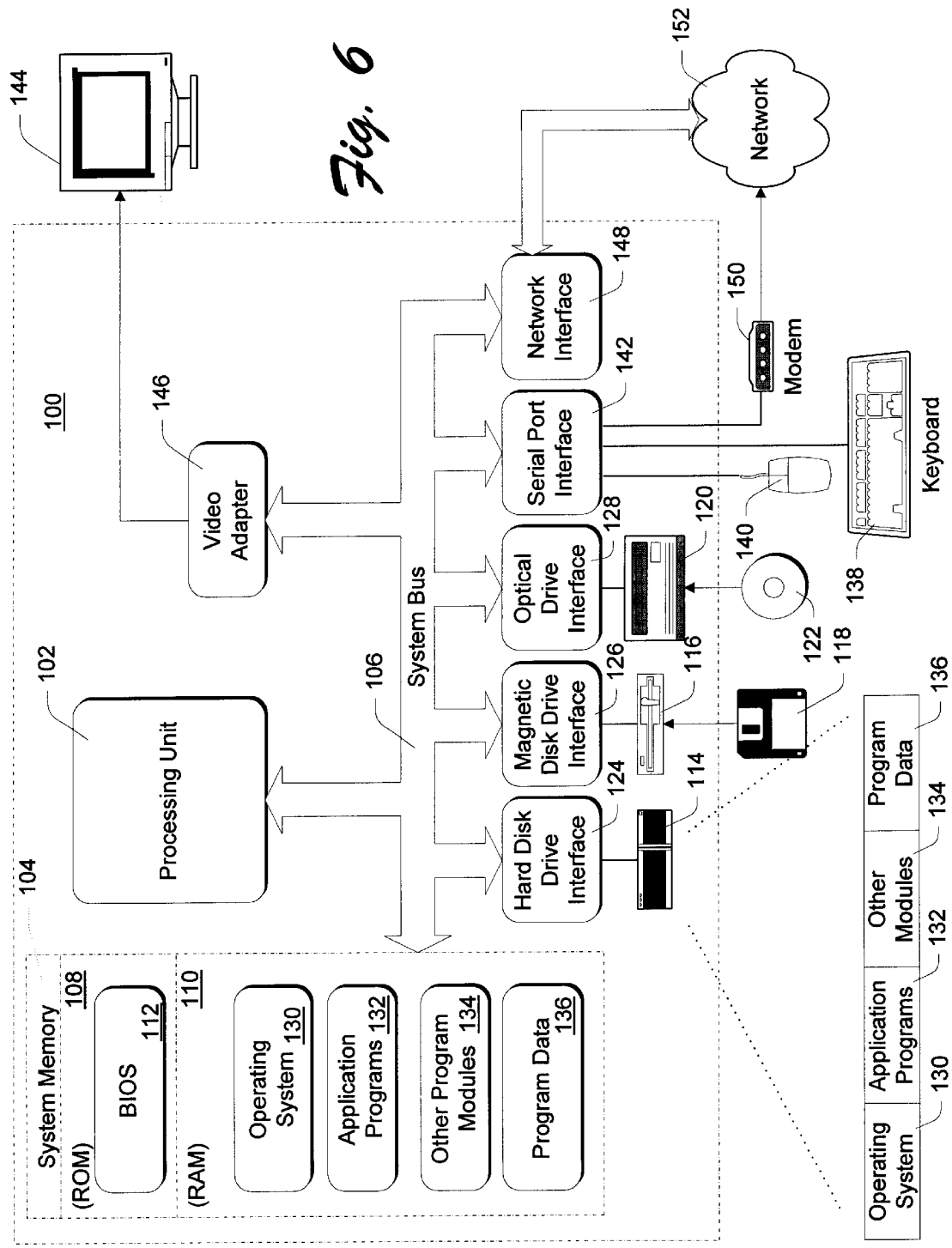
FIG. 6 shows a block diagram of a server computer used to implement the server software architecture.

FIG. 6 shows an example implementation of a server computer 100, which can be used to implement the server architecture 60. The server 100 includes a processing unit 102, a system memory 104, and a system bus 106 that interconnects various system components, including the system memory 104 to the processing unit 102. The system bus 106 may be implemented as any one of several bus structures and using any of a variety of bus architectures, including a memory bus or memory controller, a peripheral bus, and a local bus.

The system memory 104 includes read only memory (ROM) 108 and random access memory (RAM) 110. A basic input/output system 112(BIOS) is stored in ROM 108.

The server 100 has one or more of the following drives: a hard disk drive 114 for reading from and writing to a hard disk or hard disk array; a magnetic disk drive 116 for reading from or writing to a removable magnetic disk 118; and an optical disk drive 120 for reading from or writing to a removable optical disk 122 such as a CD ROM or other optical media. The hard disk drive 114, magnetic disk drive 116, and optical disk drive 120 are connected to the system bus 106 by a hard disk drive interface 124, a magnetic disk drive interface 126, and an optical drive interface 128, respectively. The drives and their associated computer-readable media provide nonvolatile storage of computer readable instructions, data structures, program modules and other data for the server 100.

Although a hard disk, a removable magnetic disk 118, and a removable optical disk 122 are described, other types of computer readable media can be used to store data. Other such media include magnetic cassettes, flash memory cards, digital video disks, Bernoulli cartridges, random access memories (RAMs), read only memories (ROM), and the like.

A number of program modules may be stored on the hard disk, magnetic disk 118, optical disk 122, ROM 108, or RAM 110. These programs include a server operating system 130, one or more application programs 132, other program modules 134, and program data 136. The operating system 130 is preferably the Windows NT server operating system, although other types of operating systems may be used, such as a UNIX-based operating system. The server architecture 60 shown in FIG. 4 can be incorporated into the operation system 130, or implemented as separate applications 132 or program modules 134.

An operator may enter commands and information into the server 100 through input devices, such as a keyboard 138 and a mouse 140. Other input devices (not shown) may include a microphone, joystick, game pad, satellite dish, scanner, or the like. These and other input devices are connected to the processing unit 102 through a serial port interface 142 that is coupled to the system bus 106, but may alternatively be connected by other interfaces, such as a parallel port, game port, or a universal serial bus (USB).

A monitor 144 or other type of display device is also connected to the system bus 106 via an interface, such as a video adapter 146. The server computer 100 has a network interface or adapter 148, a modem 150, or other means for establishing communications over a network 152.

Normal Operation

Figure 7:
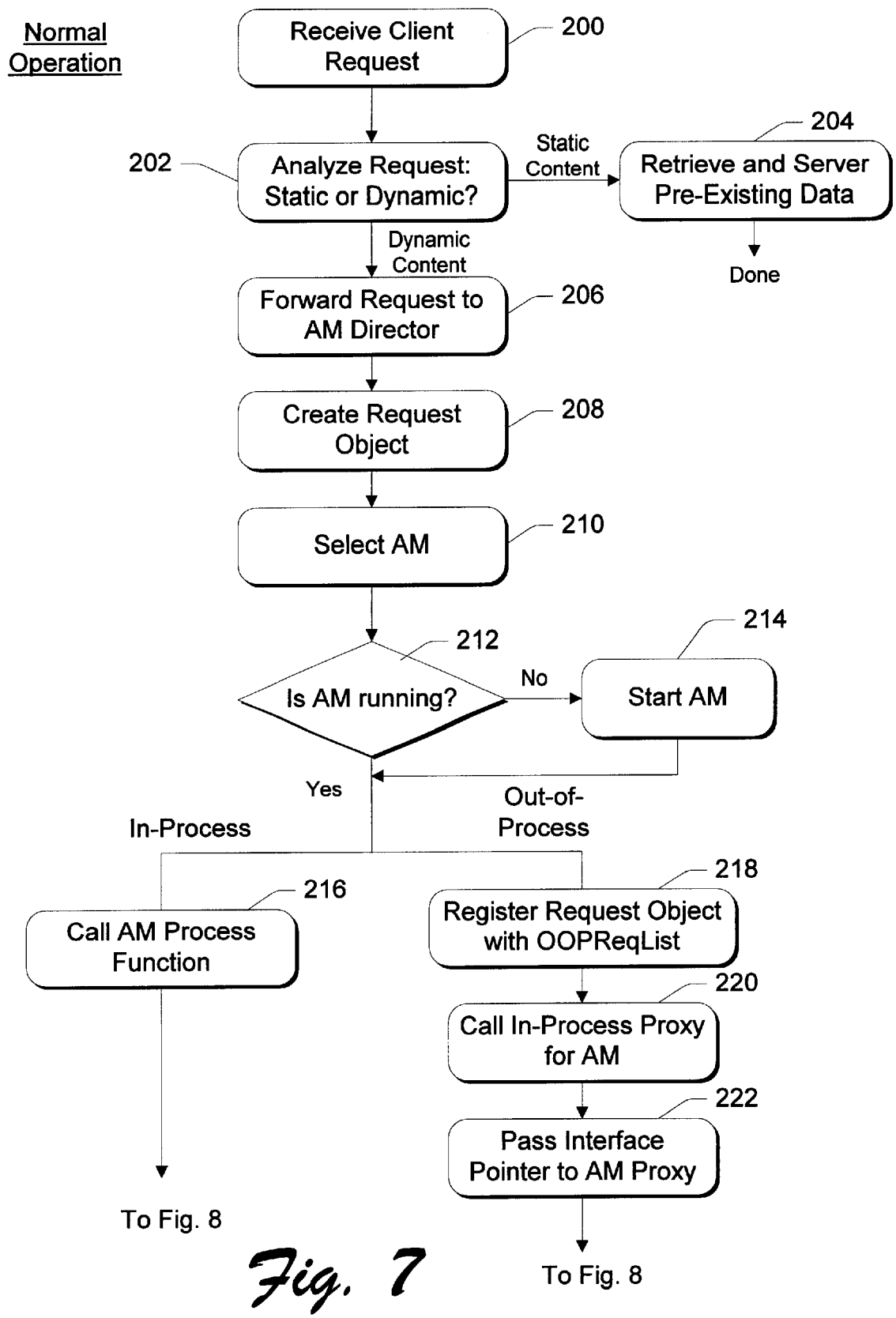
FIGS. 7–9 show steps in a method for handling client requests during normal operation.
Figure 8:
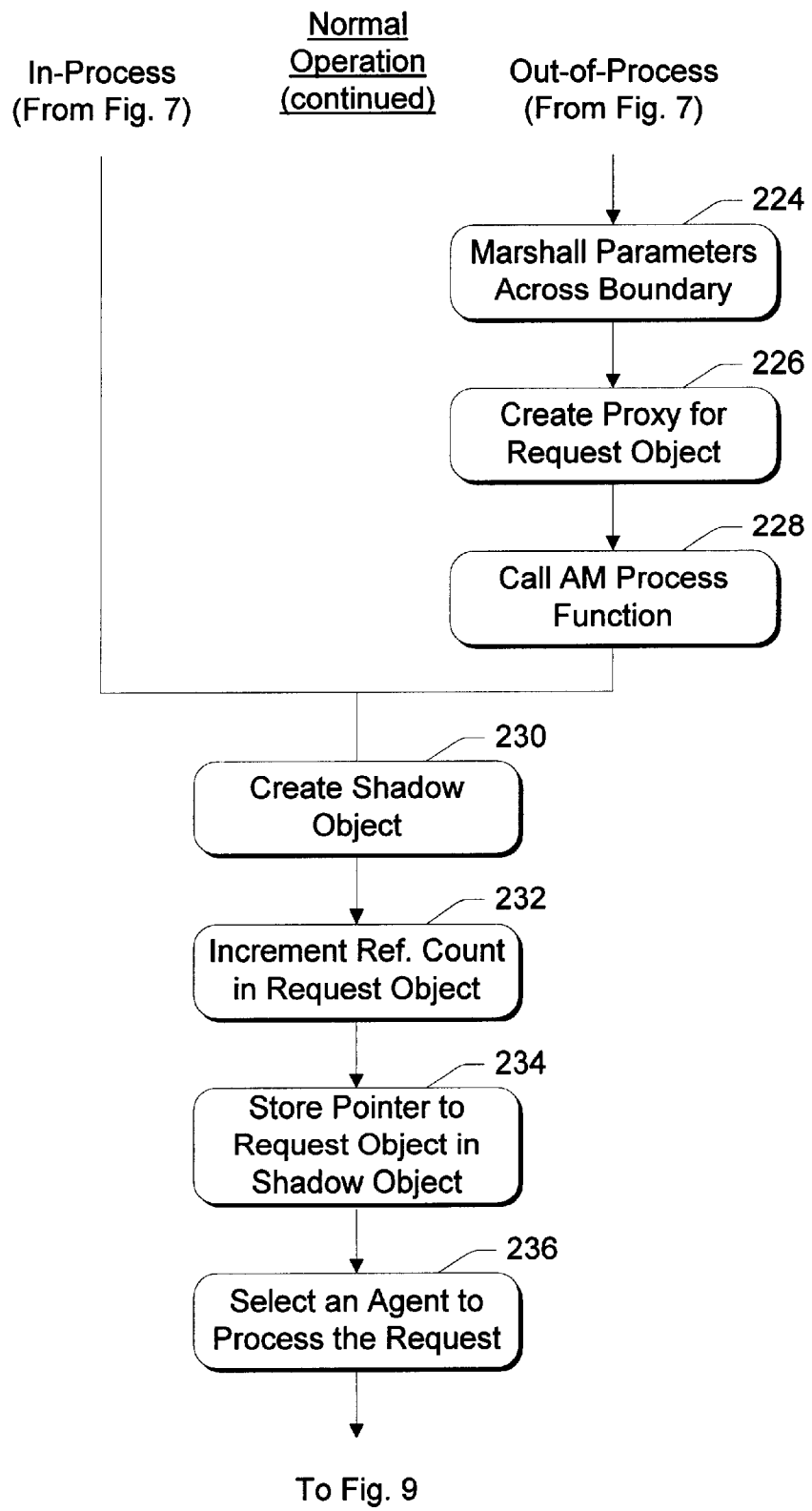
Figure 9:
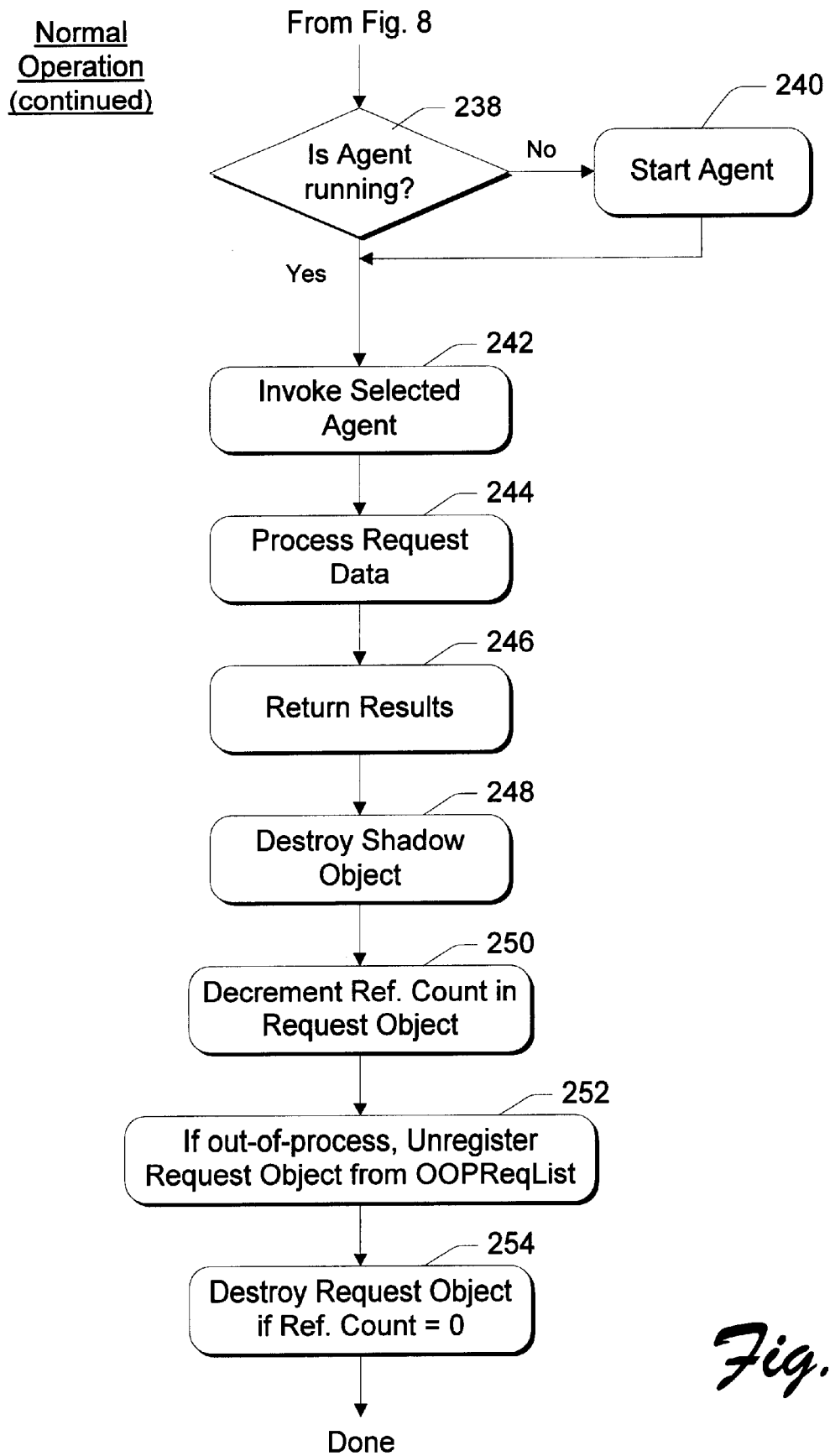

FIGS. 7–9 show steps in a method for handling requests from a remote client during normal operation. The steps are described in conjunction with the server architecture illustrated in FIGS. 4 and 5. These steps are performed by the various software components during execution on the server computer of FIG. 6.

At step 200 in FIG. 7, the server 62 receives a request from a client. The server 62 analyzes the client request to determine how to satisfy the request (step 202). If the server 62 can satisfy the client request with a static content response, such as serving a pre-existing document, the server 62 will retrieve the static data and serve that data to the client (step 204).

If the server 62 determines that the client request requires a dynamic content response and thus involves invoking an application, the server 62 forwards the request to the application manager director 70 (step 206 in FIG. 7). The director 70 creates a request object 80 to hold the request data (step 208). The director 70 then determines which application manager 64 should process the request and whether the application manager 64 should be run in-process or out-of-process (step 210 in FIG. 7).

Once the specific application manager is selected, the application manager director 70 determines whether that application manager is already running (step 212 in FIG. 7). If not (i.e., the "no" branch from step 212), the director 70 starts the required application manager 64 and loads a corresponding AMInfo object 74(or AMInfoOOP object) to the director's table 72 of active application managers (step 214).

If the application manager is in-process (e.g., AM object 64(1)), the director 70 calls a process function in the AM object 64(1) and passes in an interface pointer to the request object (e.g., request object 80(1,1)) (step 216 in FIG. 7).

On the other hand, if the application manager is out-of-process (e.g., AM object 64(3)), the AMInfoOOP object 74(3) registers the request object 80(3,1) with the OOPReqList object 90(step 218 in FIG. 7). The director 70 then calls an in-process proxy for the out-of-process AM object 64(3) (step 220). The director 70 passes to the proxy the interface pointer to the request object (e.g., request object 80(3,1)) (step 222 in FIG. 7). The proxy then marshals parameters and makes the cross-process call via COM and RTC to the out-of-process stub for the AM object 64(3) (step 224 in FIG. 8). COM creates a proxy for the request object 80(3,1) within the out-of-process space (step 226 in FIG. 8). The AM object's stub un-marshals the parameters and calls the process function in the AM object 64(3), passing in the request object's proxy as one of the parameters (step 228 in FIG. 8).

The selected application manager (e.g., in-process AM object 64(1) or out-of-process AM object 64 (3)) creates a shadow object 84 for the corresponding request (step 230 in FIG. 8). The application manager 64 increments the reference count of the request object 80(or proxy, if the AM object is running out-of-process) (step 232 ), and stores the request object's (or proxy's) interface pointer in the shadow object (step 234).

The application manager 64 determines which agent 66 should be invoked to satisfy the particular request (step 236 in FIG. 8). The application manager 64 then determines whether the desired agent is already running (step 238 in FIG. 9). If not, the application manager loads the agent and adds it to the AM object's table of running agents (step 240 in FIG. 9).

The application manager invokes the selected agent 66, passing it information about the user's request (step 242 in FIG. 9). The agent 66 then processes the request using the data in the newly created shadow object 84(step 244).

The application manager receives any calls made by the agent 66 for server services via the ISAPI callback functions. For example, the agent 66 could call back to read information from or write information to the request's network connection, or get information like user name or browser type for the request. If the application manager is running in-process, the application manager uses the interface pointer to the request object to invoke a method that is appropriate to handle the agent's callback. If the application manager is running out-of-process, the application manager uses the interface pointer to the proxy for the request object to invoke a method appropriate to the agent's callback.

When the agent 66 indicates that it has finished processing the request (e.g., by calling a particular interface to the application manager), the agent passes the results back out to the application manager, which in turn passes the results back to the server 62(step 248 in FIG. 9). The application manager 64 destroys the shadow object 84(step 250) and decrements the reference count of the request object (or proxy) (step 252). For an out-of-process application, the request object (e.g., 80(3,1)) is also unregistered from the OOPReqList object 90(step 254 in FIG. 9). When the request object's reference count reaches zero, it destroys itself (step 256).

Crash Detection and Recovery Operation

Figure 10:
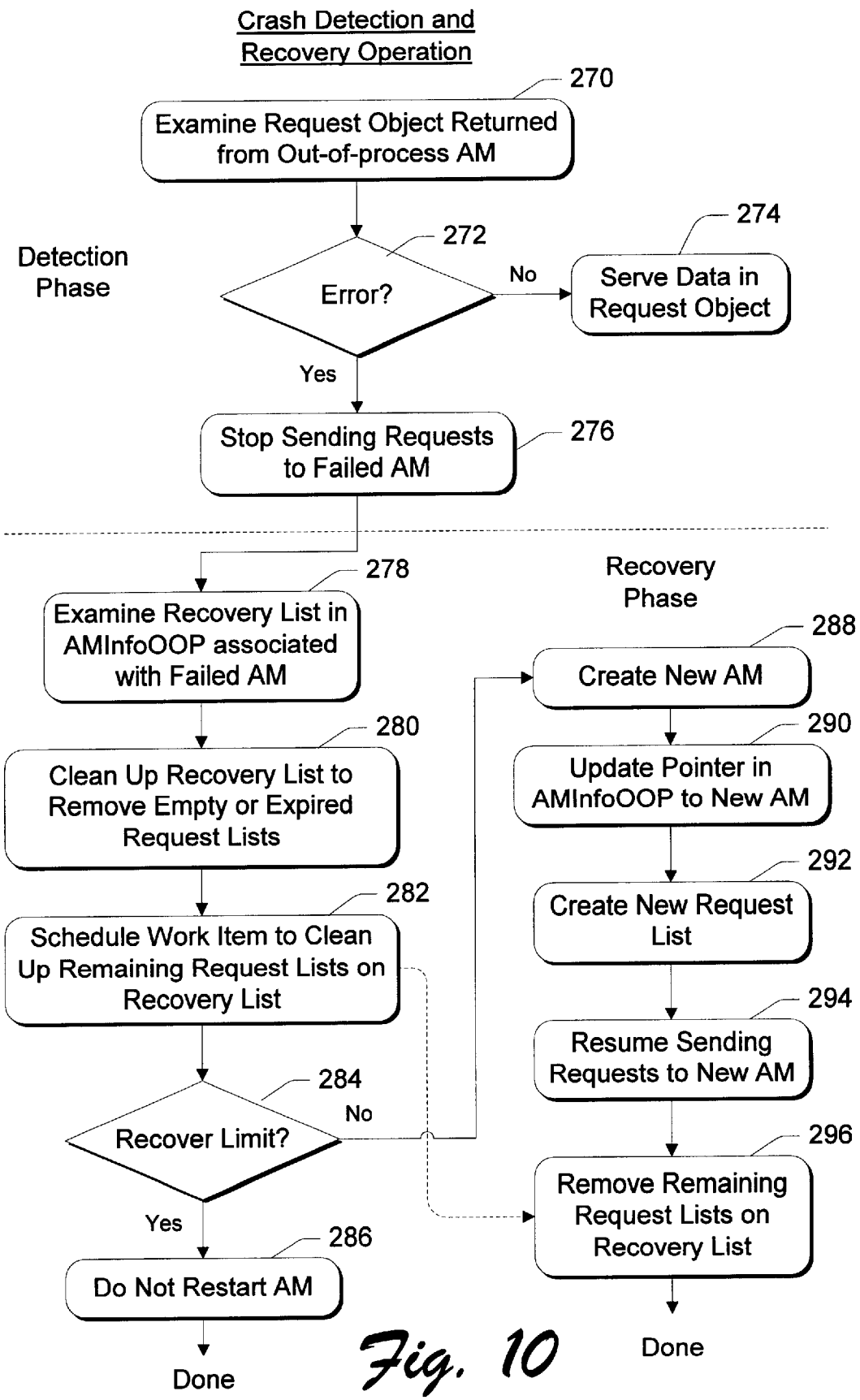
FIG. 10 shows steps in a method for detecting when an out-of-process application fails and recovering from the failure to restore the application.

FIG. 10 shows steps in a method for detecting when an out-of-process application manager (or agent under its control) crashes and then recovering the failed application manager after the crash. The steps are described in conjunction with the illustrations in FIGS. 11–13, as well as with continued reference to the server architecture illustrated in FIGS. 4 and 5. These steps are performed by various software components during execution on the server computer of FIG. 6.

The method involves two phases: a detection phase and a recovery phase. In the detection phase, the AMInfoOOP object 74(3) examines each returning request object 80(3,1) and 80(3,2) for an error that tends to indicate abnormal behavior (step 270 in FIG. 10). If there is no error (i.e., the "no" branch from step 272), the reference to the request object is released (i.e., the reference count field in the request object is reduced) and the data returned in the request object is served to the client (step 274 in FIG. 10).

Figure 11:
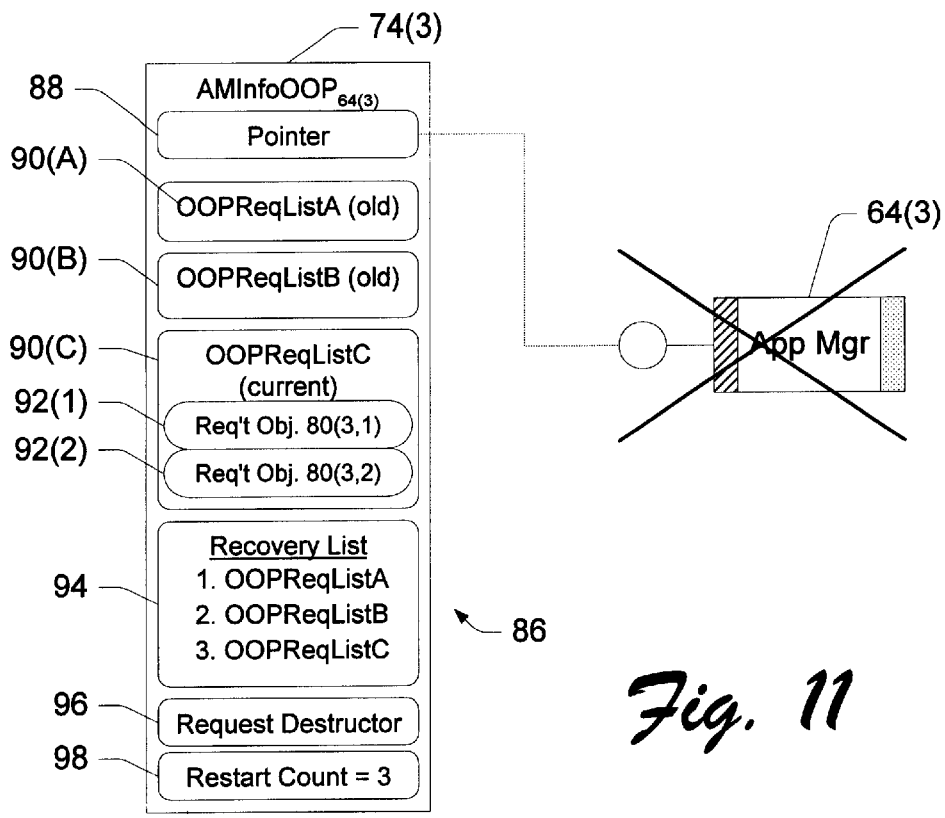
FIGS. 11–13 illustrate the software architecture during the various steps in the FIG. 10 method.

On the other hand, if a request object returns from out-of-process execution with an RPC/COM-level error (i.e., the "yes" branch from step 272), the AMInfoOOP object 74(3) concludes that the out-of-process application manager 64(3), or agent under its control, has crashed. This is illustrated in FIG. 11 with the "X" superimposed on the out-of-process application manager 64(3). Accordingly, at step 276, the AMInfoOOP object 74(3) stops serving new request objects to the application manager 64(3), effectively closing the gate to the failed application. This process concludes the detection phase.

The recovery phase begins with an examination of the recovery list 94 within the AMInfoOOP object 74(3) to determine which OOPReqLists are posted and need recycling (step 278 in FIG. 10). In the FIG. 11 example, suppose there are three OOPReqLists entered in the recovery list 94—OOPReqListA, OOPReqListB, and OOPReqListC—for the corresponding OOPReqList objects 90(A), 90(B), and 90(C). The first two OOPReqList objects 90(A) and 90(B) represent objects that were once associated with previous instances of the out-of-process application manager 64(3), but remain left over from previous failures of those instances. That is, for purposes of discussion, assume that the out-of-process application manager 64(3) has already failed twice, and is currently on its third restart. The counter 98 reflects that the application manager 64(3) has been restarted three times. The third OOPReqList object 90(C) is the current object facilitating output of the request objects to the third instance of the application manager 64(3).

Figure 12:
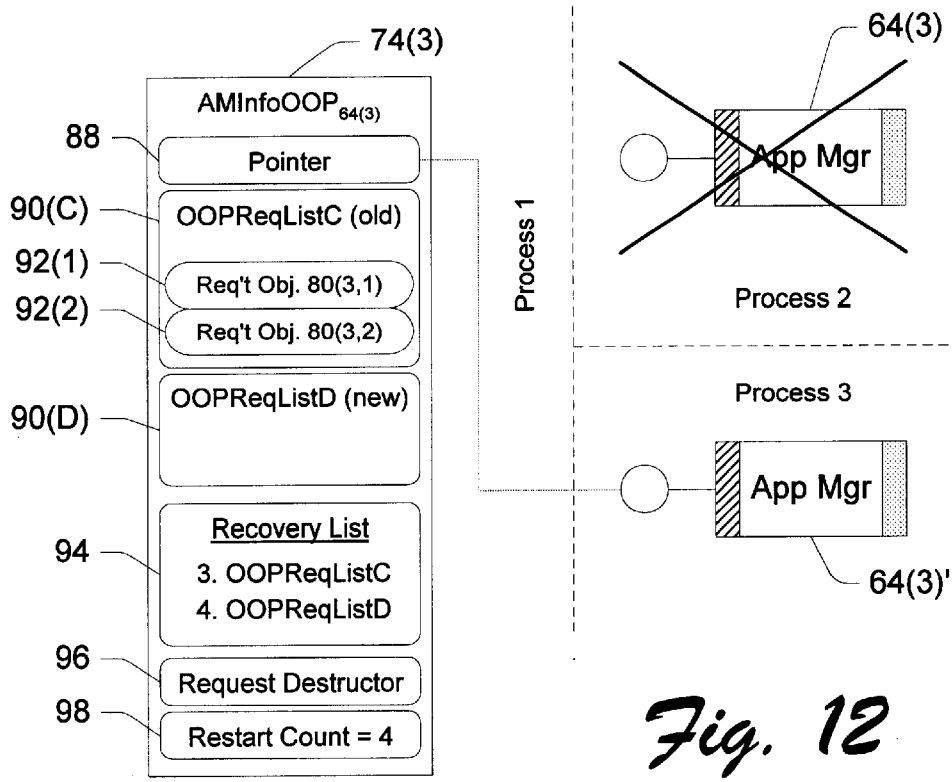

The next step is to clean up the recovery list 94 by deleting all referenced OOPReqList objects that are empty or expired (step 280). Assume that OOPReqList object 90(A) is now empty and OOPReqList object 90(B) is now expired. Accordingly, the clean up step 280 removes these entries from the recovery list 94. The result of this step is shown in FIG. 12, with the two entries for OOPReqListA and OOPReqListB being removed from the recovery list 94.

If one or more OOPReqList objects remain on the recovery list 94, the AMInfoOOP object 74(3) schedules a work item to clean up the rest of the recovery list 94 at a future time (step 282). In the example of FIG. 12, the OOPReqList object 90(C) remains listed on the recovery list 94. Hence, the AMInfoOOP object 74(3) schedules a work item to finishing cleaning up OOPReqList object 90(C) at a later time.

At step 284 in FIG. 10, the AMInfoOOP object 74(3) determines whether the recover limit for the out-of-process application manager has been reached. If so, the application is not restarted (step 286 in FIG. 10). If the recover limit has not been reached (i.e., the "no" branch from step 284), a new instance of the out-of-process application manager is created in a new process space (step 288). FIG. 12 illustrates a new instance of the out-of-process application manager 64(3)' in a separate process space. The counter 98 is incremented to four.

The internal pointer 88 in the AMInfoOOP object 74(3) is then updated to the new out-of-process application manager 64(3)' so that all future requests are directed to the new instance of the application manager (step 290). As illustrated in FIG. 12, the pointer 88 is moved from the old instance of AM object 64(3) to the new instance of the AM object 64(3)'. The AMInfoOOP object 74(3) creates a new OOPReqList object 90(D) and adds it to the recovery list 94(step 292). Thus, all newly created request objects for incoming client requests are registered into the new OOPReqList object 90(D). The AMInfoOOP object 74(3) resumes to serve new request objects to the restarted application (step 294). The new AM object 64(3)' will then restart the appropriate agents to process the new requests.

At step 296 in FIG. 10, the remaining request objects are removed from the old OOPReqList object when COM releases the last reference after a COM/RPC time-out period or during the recovery list cleanup. The AMInfoOOP object 74(3) uses the request destructor 96 to assist in removing any remaining request objects from the old OOPReqList. With respect to FIG. 12, the request objects 80(3,1) and 80(3,2) are removed from the OOPReqList object 90(C). The memory occupied by the data structure of the removed request object is then available to be recycled.

Figure 13:
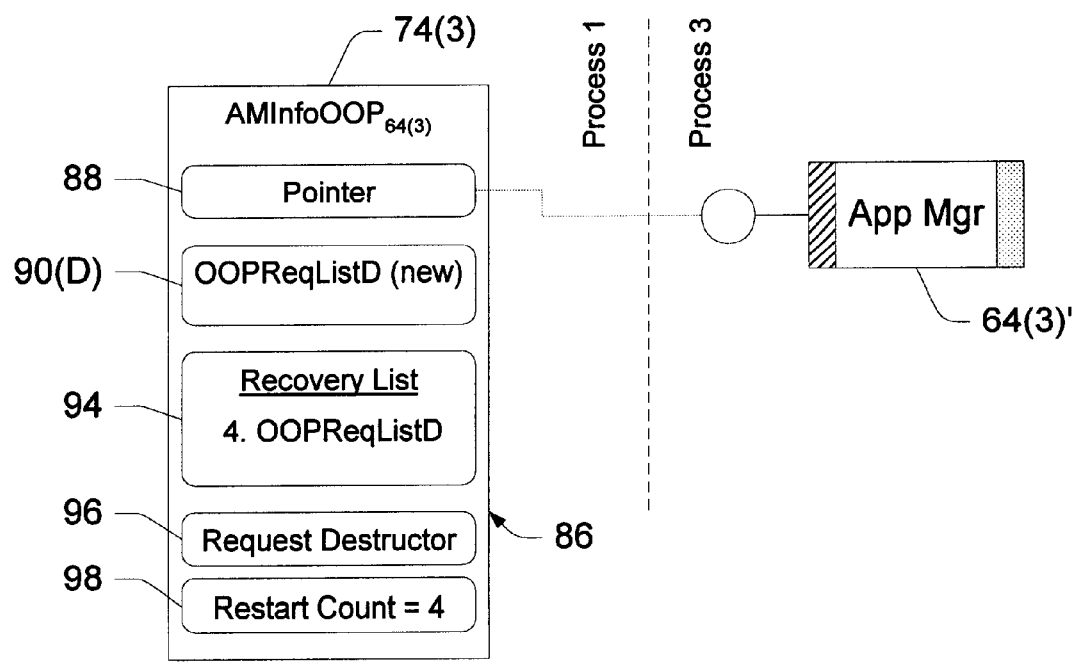

FIG. 13 illustrates the components after full recovery. The OOPReqListC entry is removed from recovery list 90 and the corresponding OOPReqList object 90(C) is removed from the AMInfoOOP object 74(3).

The server architecture 60 is beneficial because it permits a designer to easily separate trusted agents from non-trusted agents. Trusted agents and their application manager can be run in-process with the server software to improve performance. Meanwhile, non-trusted agents and their application manager can be run out-of-process from the server software until they prove themselves reliable. If the non-trusted agents ultimately prove to be trusted, they can be moved in-process with little adaptation. Moreover, in the event that an out-of-process agent fails, the server architecture enables detection of the failure and recovery of the failed agent.

The architecture 60 enables developers to organize the applications, as desired, to enforce consistency, compatibility, version control, and other requirements across components. The server architecture 60 allows the flexibility to run an agent or a collection of agents in-process for highest performance, or out-of-process for highest reliability. Even when run out-of-process, the agents and application managers can remain loaded between user requests, thereby improving performance as compared to the conventional load-and-unload of CGI.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. A server software architecture embodied on a computer-readable medium for implementation on a computer server system, the server software architecture comprising:
   a server program to receive a client request from a client and return a response to the client;
   an out-of-process application executing in a separate process from the server program, the out-of-process application being invoked to process the client request received by the server program and to generate the response to be returned to the client; and
   a subsystem to detect when the out-of-process application fails and to recover the out-of-process application without disrupting operation of the server program wherein the subsystem records the client request in a list before the client request is transferred from the server program to the out-of-process application, and wherein the subsystem removes the client request from the list when the response is returned from the out-of-process application.

2. A server software architecture embodied on a computer-readable medium for implementation on a computer server system, the server software architecture comprising:
   a server program to receive a client request from a client and return a response to the client;
   an out-of-process application executing in a separate process from the server program, the out-of-process application being invoked to process the client request received by the server program and to generate the response to be returned to the client; and
   a subsystem to detect when the out-of-process application fails and to recover the out-of-process application without disrupting operation of the server program, wherein the subsystem records the client request in a list before the client request is transferred from the server program to the out-of-process application, and wherein the subsystem cleans up the client request on the list in an event that the out-of-process application fails before the client request is removed from the list.

3. A server software architecture embodied on a computer-readable medium for implementation on a computer server system, the server software architecture comprising:
   a server program to receive a client request from a client and return a response to the client;
   an out-of-process application executing in a separate process from the server program, the out-of-process application being invoked to process the client request received by the server program and to generate the response to be returned to the client; and
   a subsystem to detect when the out-of-process application fails and to recover the out-of-process application without disrupting operation of the server program, wherein the subsystem counts the number of times it recovers the out-of-process application, and ceases to recover the out-of-process application when the number reaches a preset recover limit.

4. In a server system having a server program that executes in a first process to receive client requests and at least one out-of-process application that is executes in a second process separate from the server program to process the client requests, a subsystem for detecting failure of the out-of-process application and recovering from the failure, comprising:
   a gate component to list the client requests that are passed from the server program to the out-of-process application;
   a detection component to examine responses returned from the out-of-process application to detect whether the out-of-process application has failed; and
   a recovery component to cleanup, in an event the out-of-process application has failed, those client requests that remain listed by the gate component, but have not yet been responded to by the failed out-of-process application.

5. A subsystem as recited in claim 4, wherein the recovery component restarts the out-of-process application.

6. A subsystem as recited in claim 4, further comprising a list object to hold references to the client requests being passed to the out-of-process application.

7. A subsystem as recited in claim 6, further comprising a recovery list having an entry identifying the list object.

8. A subsystem as recited in claim 7, wherein the recovery component restarts the out-of-process application, creates a second list object to hold references to the client requests being passed to the restarted out-of-process application, and adds an entry to the recovery list for the second list object.

9. A subsystem as recited in claim 4, wherein the gate component, the detection component, and the recovery component are implemented in a software object that runs in the first process along with the server program.

10. A subsystem as recited in claim 4, wherein the gate component, the detection component, and the recovery component are incorporated into a server operating system.

11. A server software architecture embodied on a computer-readable medium for implementation on a computer server system, the server software architecture comprising:
- a server program to receive a client request from a client and return a response to the client;
- an application manager director to handle the client request in an event that a response to the client request will involve at least some content generation;
- at least one application manager independent from, but dynamically accessible by, the application manager director;
- at least one agent independent from, but dynamically accessible by, the application manager, the agent comprising capabilities to process the client request to generate the response;
- the application manager and the agent, when invoked, being run in a separate process from the server program;
- an information object maintained at the application manager director to direct requests to an out-of-process application manager, the information object recording on a list the client requests that are passed to the out-of-process application manager and removing from the list the client requests that are returned from the out-of-process application manager; and
- in an event that the out-of-process application manager fails, the information object blocking future client requests destined for the out-of-process application manager and cleaning up the client requests that remain on the list as being unanswered by the failed out-of-process application manager, the information object then restarting the out-of-process application manager and permitting the future client requests to flow to the restarted out-of-process application manager.

12. A server software architecture as recited in claim 11, wherein the information object maintains a recovery list that identifies the list of client requests as a possible list requiring clean up in the event the out-of-process application manager fails.

13. A server software architecture as recited in claim 11, further comprising a second application manager and a second agent that run, when invoked, in the same process as the server program.

14. A server software architecture as recited in claim 11, wherein the application manager director maintains a table that lists the application managers that are running.

15. A server software architecture as recited in claim wherein said each application manager maintains a table that lists the agents that are running.

16. In a server system having a server program to receive a client request from a client and a dynamic content generation system to dynamically generate content to be served back to the client, the dynamic content generation system comprising an application manager director, one or more application managers that are dynamically accessible by the application manager director to handle the client request, and one or more agents grouped in association with the application managers and dynamically accessible by the associated application managers to process the client request, wherein the one or more application managers and their associated group of agents can be run in-process or out-of-process with the server program, a crash detection and recovery subsystem embodied as software modules on a computer-readable medium comprising:
- (A) a detection module comprising:
  - code means for recording a client request on a list as the client request is passed to an out-of-process application manager;
  - code means for examining the client request as it is returned from the out-of-process application manager to detect whether the out-of-process application manager has failed;
- (B) a recovery module that is invoked when the detection module determines that the out-of-process application manager has failed, the recover module comprising:
  - code means for blocking future client requests destined for the out-of-process application manager;
  - code means for cleaning up the client requests remaining on the list;
  - code means for restarting the out-of-process application manager; and
  - code means for permitting the future client requests to be passed to the restarted out-of-process application manager.

17. A crash detection and recovery subsystem as recited in claims 16, wherein the detection module and the recovery module are implemented in a single software object resident at the application manager director.

18. A crash detection and recovery subsystem as recited in claim 16, wherein recovery module further comprises code means for counting a number of times the out-of-process application is restarted.

19. A crash detection and recovery subsystem as recited in claim 18, wherein recovery module further comprises code means for ceasing to restart the out-of-process application after the number of restart times reaches a preset recover limit.

20. A server operating system comprising the crash detection and recovery subsystem as recited in claim 16.

21. A server computer system comprising:
- a processing unit;
- a memory subsystem;
- a server program stored in the memory subsystem and executed on the processing unit to receive client requests; and
- multiple applications stored in the memory subsystem and executed on the processing unit either in-process or out-of-process with the server program to dynamically generate responses to the client requests, each said application comprising one or more agents to process the client requests and an application manager to manage the one or more agents;
- an application manager director to facilitate delivery of the client requests received by the server program to the applications that are appropriate for processing the client requests; and
- a crash detection and recovery subsystem to detect when an out-of-process application fails and to recover the out-of-process application without disrupting operation of the server program, wherein the crash detection and recovery subsystem records the client requests being delivered to the out-of-process application in a list, and wherein the crash detection and recovery subsystem cleans up the client request on the list in an event that the out-of-process application fails before the client request is removed from the list.

22. A server computer system comprising:
- a processing unit;

a memory subsystem;

a server program stored in the memory subsystem and executed on the processing unit to receive client requests; and multiple applications stored in the memory subsystem and executed on the processing unit either in-process or out-of-process with the server program to dynamically generate responses to the client requests, each said application comprising one or more agents to process the client requests and an application manager to manage the one or more agents;

an application manager director to facilitate delivery of the client requests received by the server program to the applications that are appropriate for processing the client requests; and a crash detection and recovery subsystem to detect when an out-of-process application fails and to recover the out-of-process application without disrupting operation of the server programs wherein the crash detection and recovery subsystem records the client requests being delivered to the out-of-process application in a list, and wherein the crash detection and recovery subsystem counts the number of times it recovers the out-of-process application, and ceases to recover the out-of-process application when the number reaches a preset recover limit.

23. A server computer system comprising:

a processing unit;

a memory subsystem;

a server program stored in the memory subsystem and executed on the processing unit to receive client requests; and multiple applications stored in the memory subsystem and executed on the processing unit either in-process or out-of-process with the server program to dynamically generate responses to the client requests, each said application comprising one or more agents to process the client requests and an application manager to manage the one or more agents;

an application manager director to facilitate delivery of the client requests received by the server program to the applications that are appropriate for processing the client requests;

a crash detection and recovery subsystem to detect when an out-of-process application fails and to recover the out-of-process application without disrupting operation of the server program;

wherein the application manager director creates request objects to hold data contained in corresponding ones of the client requests; and wherein the application managers create shadow objects for corresponding request objects, the shadow objects holding at least a subset of the data contained in the corresponding request objects.

24. In a server system having a server program that executes in a first process to receive client requests and at least one out-of-process application that executes in a second process separate from the server program to process the client requests, a method for recovering the out-of-process application after it fails, comprising the following steps:

blocking new client requests destined for the failed out-of-process application;

cleaning up old client requests that remain unanswered due to failure of the out-of-process application;

restarting the out-of-process application in a third process separate from the first and second processes; and permitting the new client requests to flow to the restarted out-of-process application.

25. A method as recited in claim 24, further comprising the step of counting a number of times the out-of-process application is restarted.

26. A method as recited in claim 25, further comprising the step of ceasing to restart the out-of-process application after the number of restart times reaches a preset recover limit.

27. A computer-readable medium having computer-executable instructions for performing the steps as recited in claim 24.

28. In a server system having a hierarchic managerial architecture comprising an application manager director, one or more application managers that are dynamically accessible by the application manager director, and one or more agents grouped in association with the application managers and dynamically accessible by the associated application managers, wherein the one or more application managers and their associated group of agents can be run in-process or out-of-process with the server program, a method comprising the following steps:

(A) detecting when an out-of-process application manager fails, comprising the following steps:

recording a client request on a list as the client request is passed to an out-of-process application manager;

examining the client request as it is returned from the out-of-process application manager to detect whether the out-of-process application manager has failed;

(B) in an event that the out-of-process application manager has failed, recovering the failed out-of-process application manager comprising the following steps:

blocking future client requests destined for the out-of-process application manager;

cleaning up the client requests remaining on the list;

restarting the out-of-process application manager; and permitting the future client requests to flow to the restarted out-of-process application manager.

29. A method as recited in claim 28, further comprising the step of counting a number of times the out-of-process application is restarted.

30. A method as recited in claim 29, further comprising the step of ceasing to restart the out-of-process application after the number of restart times reaches a preset recover limit.

31. A computer-readable medium having computer-executable instructions for performing the steps as recited in claim 28.

* * * * *

UNITED STATES PATENT AND TRADEMARK OFFICE
CERTIFICATE OF CORRECTION

PATENT NO. : 6,330,689 B1  Page 1 of 1
DATED : December 11, 2001
INVENTOR(S) : Jin et al.

It is certified that error appears in the above-identified patent and that said Letters Patent is hereby corrected as shown below:

Column 8,
Line 8, change "wheth" to -- whether --.

Column 12,
Line 59, change "RTC" to -- RPC --.

Signed and Sealed this

Twenty-fifth Day of June, 2002

Attest:

JAMES E. ROGAN
Attesting Officer  Director of the United States Patent and Trademark Office